US012680653B2

(12) United States Patent
    Tallman et al.

(10) Patent No.: US 12,680,653 B2
(45) Date of Patent: Jul. 14, 2026

(54) PRESSURE RELIEF SHIPPING ADAPTER

(71) Applicant: Lockheed Martin Corporation,
                 Bethesda, MD (US)

(72) Inventors: Cory Roger Tallman, Fort Worth, TX
                 (US); Jake R. Judice, Fort Worth, TX
                 (US); James Robert Moore, III,
                 Haslet, TX (US); Mark S. Osborne,
                 Shady Shores, TX (US)

(73) Assignee: Lockheed Martin Corporation,
                 Bethesda, MD (US)

( * ) Notice: Subject to any disclaimer, the term of this
              patent is extended or adjusted under 35
              U.S.C. 154(b) by 152 days.

(21) Appl. No.: 18/489,221

(22) Filed: Oct. 18, 2023

(65) Prior Publication Data

US 2025/0129894 A1    Apr. 24, 2025

(51) Int. Cl.
    *F17C 13/04*        (2006.01)
    *F16K 17/02*        (2006.01)

(52) U.S. Cl.
    CPC .............. *F17C 13/04* (2013.01); *F16K 17/02*
        (2013.01); *F17C 2205/0157* (2013.01); *F17C*
            *2205/0332* (2013.01); *F17C 2205/0382*
        (2013.01); *F17C 2205/0388* (2013.01); *F17C*
            *2260/021* (2013.01); *F17C 2270/0186*
                                              (2013.01)

(58) Field of Classification Search
    CPC ........ F17C 2201/0109; F17C 2201/056; F17C
                2205/0332; F17C 2205/0382; F17C
                2205/0388; F17C 2221/011; F17C
                2223/0123; F17C 2223/036; F17C
                2260/021; F17C 2260/042; F17C
                2270/0186; F17C 2270/079
    See application file for complete search history.

(56) References Cited

U.S. PATENT DOCUMENTS

| | | | | | |
|---|---|---|---|---|---|
| 2,288,642 | A | * | 7/1942 | Powell | F16K 17/02 |
| | | | | | 251/61.3 |
| 2,465,095 | A | * | 3/1949 | Harvey | F17C 13/123 |
| | | | | | 220/327 |
| 2,810,527 | A | * | 10/1957 | Work | F16K 17/003 |
| | | | | | 236/80 R |

(Continued)

FOREIGN PATENT DOCUMENTS

| | | |
|---|---|---|
| CN | 108591820 A | 9/2018 |
| EP | 2796848 B1 | 12/2017 |
| JP | 57008432 A | 1/1982 |

OTHER PUBLICATIONS

Extended European Search Report corresponding to European Patent Application No. 24203007.0, dated Feb. 26, 2025, 8 pages.

*Primary Examiner* — William M Mccalister
(74) *Attorney, Agent, or Firm* — Baker Botts L.L.P.

(57) ABSTRACT

Systems and methods are disclosed for using a pressure relief shipping adapter to reduce the internal pressure of a container. A pressure relief shipping adapter includes a body comprising a first portion, a transitional portion, and a second portion. The first portion comprises a set of protrusions and a hole disposed through the set of protrusions. The second portion comprises an outlet disposed at a second end of the body. The outlet is concentric with an inlet disposed at the first end of the body. The transitional section is disposed between the first portion and the second portion. The pressure relief shipping adapter also includes an internal chamber within the body.

18 Claims, 8 Drawing Sheets

(56)          References Cited

U.S. PATENT DOCUMENTS

| | | | | |
|---|---|---|---|---|
| 2,844,165 A * | 7/1958 | Morse | F16K 17/196 | 137/493.6 |
| 2,871,877 A * | 2/1959 | Work | F16K 17/085 | 137/469 |
| 2,972,998 A * | 2/1961 | Detwiler | F16K 13/06 | 137/68.13 |
| 3,209,773 A * | 10/1965 | Klaus | F16K 17/00 | 137/75 |
| 3,459,218 A * | 8/1969 | Cranage | F16K 37/00 | 261/DIG. 65 |
| 4,420,013 A * | 12/1983 | DiBlasio | F17C 13/002 | 137/382 |
| 4,441,357 A * | 4/1984 | Kahn | G01M 3/26 | 73/40 |
| 4,444,214 A * | 4/1984 | Paul, Jr. | F16K 17/1606 | 137/454.2 |
| 4,499,914 A * | 2/1985 | Schebler | A62B 7/14 | 137/81.1 |
| 4,651,728 A * | 3/1987 | Gupta | A62B 7/14 | 128/201.28 |
| 4,766,763 A * | 8/1988 | Kurtz | G01M 3/26 | 73/40 |
| 4,880,134 A * | 11/1989 | Wood, Jr. | F17C 13/06 | 137/382 |
| 5,282,493 A * | 2/1994 | Schwartz | F16K 1/305 | 137/557 |
| 6,047,727 A * | 4/2000 | Hatori | G05D 16/10 | 137/505.28 |
| 6,357,465 B1 * | 3/2002 | Caldwell | B60T 11/00 | 137/71 |
| 6,439,032 B1 * | 8/2002 | Lehmann | G01M 3/36 | 73/49.3 |
| 7,818,133 B2 | 10/2010 | Furuse | | |
| 9,089,721 B1 | 7/2015 | Horstman et al. | | |
| 10,274,118 B2 | 4/2019 | Takezawa et al. | | |
| 10,545,067 B2 | 1/2020 | Phaff et al. | | |
| 11,519,558 B2 * | 12/2022 | Ligonesche | F16K 35/14 | |
| 11,604,179 B2 * | 3/2023 | Alsalman | G01N 33/007 | |
| 11,692,672 B2 * | 7/2023 | Moore, III | F17C 13/04 | 251/149.9 |
| 2004/0221919 A1 * | 11/2004 | MacNeal | F16L 29/02 | 141/384 |
| 2006/0016475 A1 * | 1/2006 | Hirota | F16K 17/1613 | 137/68.29 |
| 2008/0289700 A1 * | 11/2008 | Masingale | F16K 1/307 | 137/461 |
| 2013/0220447 A1 | 8/2013 | Zeyfang | | |
| 2013/0233440 A1 | 9/2013 | Holder | | |
| 2016/0084394 A1 * | 3/2016 | Wyatt | F17C 13/04 | 220/203.27 |
| 2016/0325122 A1 | 11/2016 | Contino et al. | | |
| 2020/0240524 A1 | 7/2020 | Vignerol et al. | | |
| 2022/0196212 A1 * | 6/2022 | Moore, III | B67D 7/36 | |

* cited by examiner

105

288

100

110

PRESSURE RELIEF SHIPPING ADAPTER

TECHNICAL FIELD

This disclosure generally relates to pressure reduction devices, and more specifically, to a pressure relief shipping adapter for reducing an internal pressure of a container prior to transportation.

BACKGROUND

Pressurized containers of oxygen gas are supplied to aircraft to be used in urgent situations. There is currently no tool, system, or method capable of verifying a safe condition of contents of these containers by reducing the internal pressure to a predetermined threshold value prior to transportation to the aircraft.

SUMMARY

In particular embodiments, a pressure relief shipping adapter is disclosed that includes: a body including a first portion, a transitional portion, and a second portion, wherein the transitional portion is disposed between the first portion and the second portion, wherein: the first portion includes: a set of protrusions and a hole disposed through the set of protrusions; and an inlet disposed at a first end of the body; the second portion includes an outlet disposed at a second end of the body, wherein the outlet is concentric with the inlet; an internal chamber within the body including a first section, a second section, and a third section, wherein the first section corresponds to the first portion of the body, wherein the second section corresponds to the transitional portion of the body, and wherein the third section corresponds to the second portion of the body; and a pressure relief valve disposed at the second end of the body and coupled to the outlet.

In particular embodiments, which may combine the features of some or all of the above embodiments, a pressure relief shipping adapter further includes a valve depressor disposed within the internal chamber. In particular embodiments, which may combine the features of some or all of the above embodiments, a pressure relief shipping adapter further includes a first seal and a second seal disposed within the internal chamber proximate to the inlet. In particular embodiments, which may combine the features of some or all of the above embodiments, a pressure relief shipping adapter further includes a first groove configured to receive the first seal and a second groove configured to receive the second seal.

In particular embodiments, which may combine the features of some or all of the above embodiments, the third section includes a larger volume than the first section. In particular embodiments, which may combine the features of some or all of the above embodiments, the second portion includes a larger diameter than the first portion. In particular embodiments, which may combine the features of some or all of the above embodiments, the first section includes a cylindrical volume, wherein the second section includes a truncated cone volume, and wherein the third section includes a cylindrical volume.

In particular embodiments, which may combine the features of some or all of the above embodiments, a method of using a pressure relief shipping adapter is disclosed, including: coupling the pressure relief shipping adapter to a bottle head assembly, wherein the bottle head assembly is coupled to a container containing a pressurized gas; reducing an internal pressure of the container by displacing a valve of the bottle head assembly into a valve depressor, the valve depressor disposed within an internal chamber defined by a body of the pressure relief shipping adapter; and discharging the pressurized gas from the container, through the body of the pressure relief shipping adapter, and out an outlet of the body.

In particular embodiments, which may combine the features of some or all of the above embodiments, coupling the pressure relief shipping adapter to a bottle head assembly includes inserting a pin through a hole in a set of protrusions of the pressure shipping adapter. In particular embodiments, which may combine the features of some or all of the above embodiments, a method further includes aligning a hole of a portion of the bottle head assembly disposed between the set of protrusions with the hole of the set of protrusions to be concentric.

In particular embodiments, which may combine the features of some or all of the above embodiments, the valve of the bottle head assembly is sealed within the internal chamber of the pressure relief shipping adapter. In particular embodiments, which may combine the features of some or all of the above embodiments, a pressure relief valve is disposed at an end of the body of the pressure relief shipping adapter, wherein the internal pressure of the container is reduced by venting the pressurized gas through the pressure relief valve.

In particular embodiments, which may combine the features of some or all of the above embodiments, a container pressure system is disclosed that includes: a bottle head assembly coupled to a container, wherein the container includes a pressurized gas and the bottle head assembly includes a valve; and a pressure relief shipping adapter coupled to the bottle head assembly, the pressure relief shipping adapter including: a body including a first portion, a transitional portion, and a second portion, wherein the transitional portion is disposed between the first portion and the second portion, wherein: the first portion includes: a set of protrusions and a hole disposed through the set of protrusions; and an inlet disposed at a first end of the body; the second portion includes an outlet disposed at a second end of the body, wherein the outlet is concentric with the inlet; an internal chamber within the body including a first section, a second section, and a third section, wherein the first section corresponds to the first portion of the body, wherein the second section corresponds to the transitional portion of the body, and wherein the third section corresponds to the second portion of the body; and a pressure relief valve disposed at the second end of the body and coupled to the outlet.

In particular embodiments, which may combine the features of some or all of the above embodiments, the first section includes a cylindrical volume, wherein the second section includes a truncated cone volume, and wherein the third section includes a cylindrical volume. In particular embodiments, which may combine the features of some or all of the above embodiments, the pressure relief shipping adapter further includes a valve depressor disposed within the internal chamber, and wherein the valve of the bottle head assembly is inserted into a first end of the body via the inlet. In particular embodiments, which may combine the features of some or all of the above embodiments, the pressure relief shipping adapter further includes a first seal and a second seal disposed within the internal chamber proximate to the inlet. In particular embodiments, which may combine the features of some or all of the above embodiments, the pressure relief shipping adapter further includes a first groove configured to receive the first seal and a second groove configured to receive the second seal.

In particular embodiments, which may combine the features of some or all of the above embodiments, the third section includes a larger volume than the first section. In particular embodiments, which may combine the features of some or all of the above embodiments, the second portion includes a larger diameter than the first portion. In particular embodiments, which may combine the features of some or all of the above embodiments, a hole of a portion of the bottle head assembly disposed between the set of protrusions is aligned with the hole of the set of protrusions to be concentric and to receive a pin.

BRIEF DESCRIPTION OF THE DRAWINGS

To assist in understanding the present disclosure, reference is now made to the following description taken in conjunction with the accompanying drawings, in which.

DETAILED DESCRIPTION

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 8, where like numbers are used to indicate like and corresponding parts.

Figure 1:
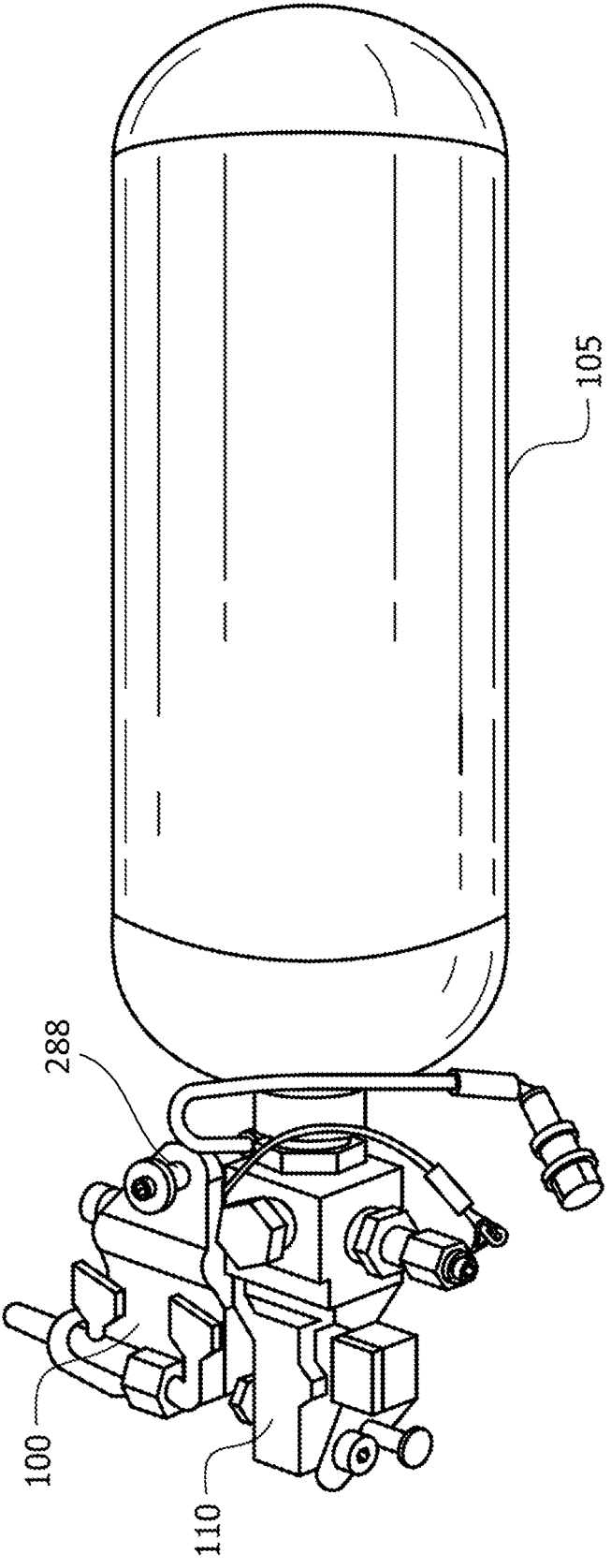
FIG. 1 illustrates an example pressure relief shipping adapter and an example container, according to certain embodiments.
Figure 2:
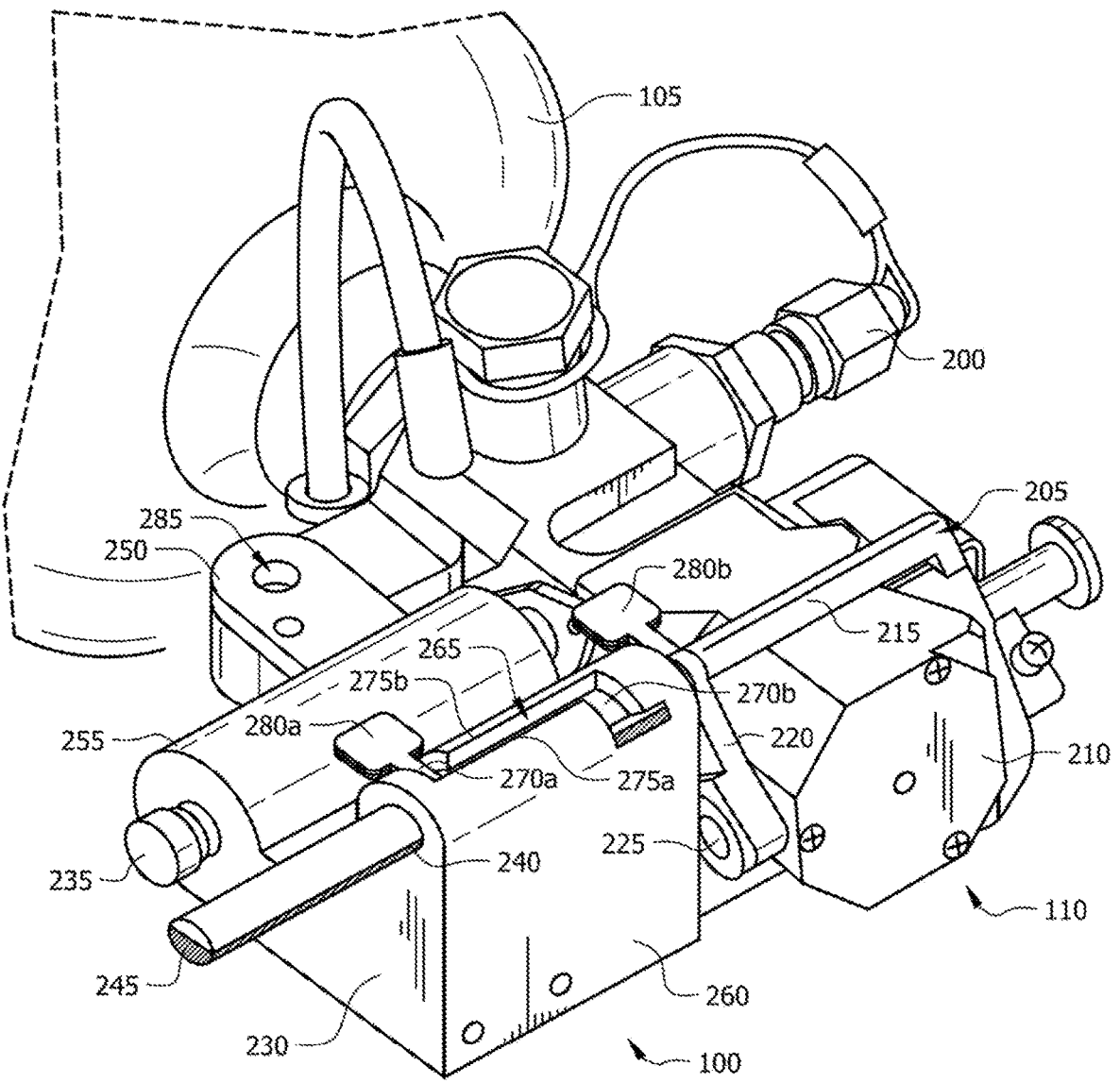
FIG. 2 illustrates an example perspective view of the pressure relief shipping adapter in FIG. 1 coupled to an example bottle head assembly, according to certain embodiments.
Figure 6:
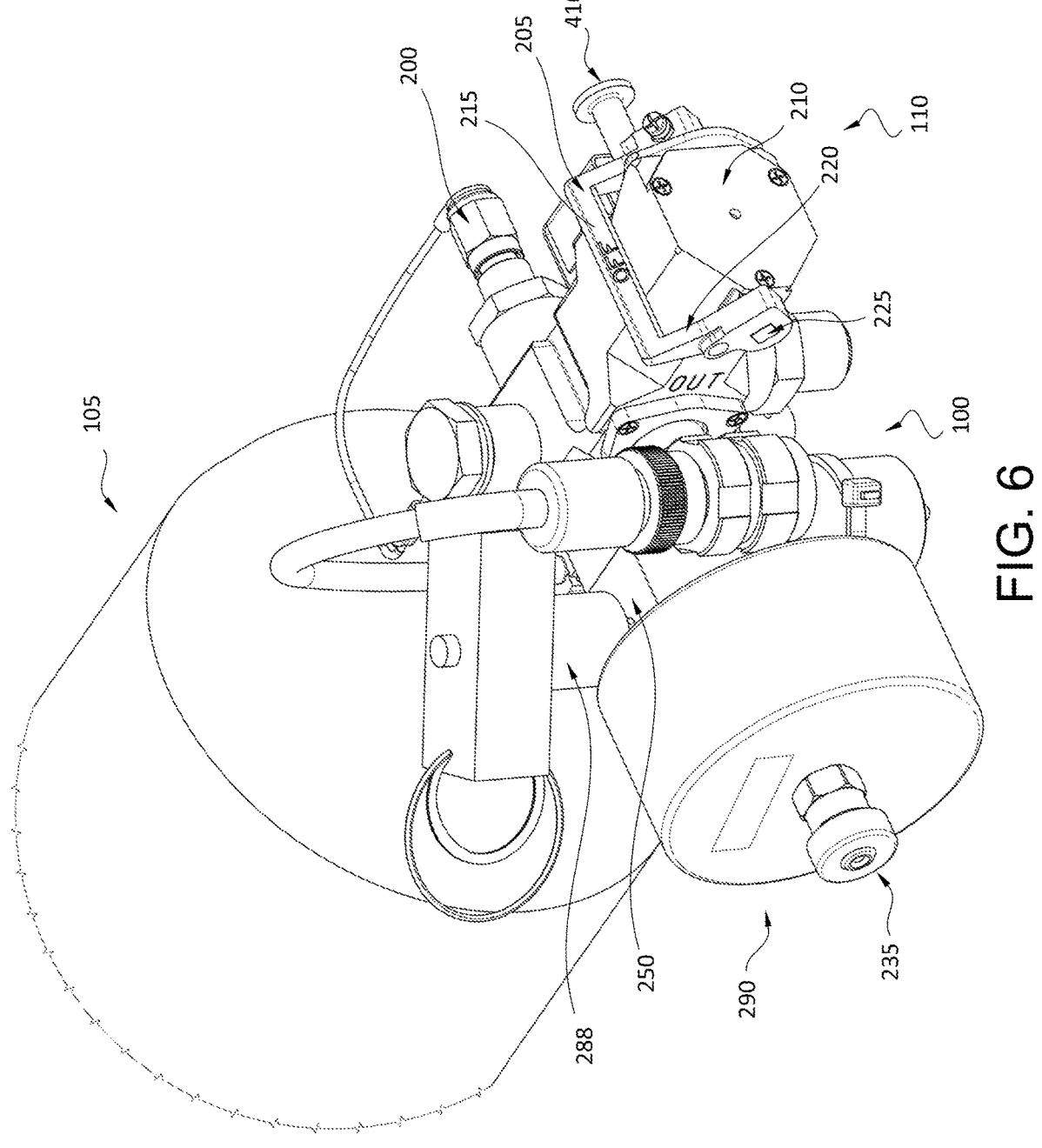
FIG. 6 illustrates a perspective view of another example pressure relief shipping adapter coupled to an example bottle head assembly, according to certain embodiments.
Figure 8:
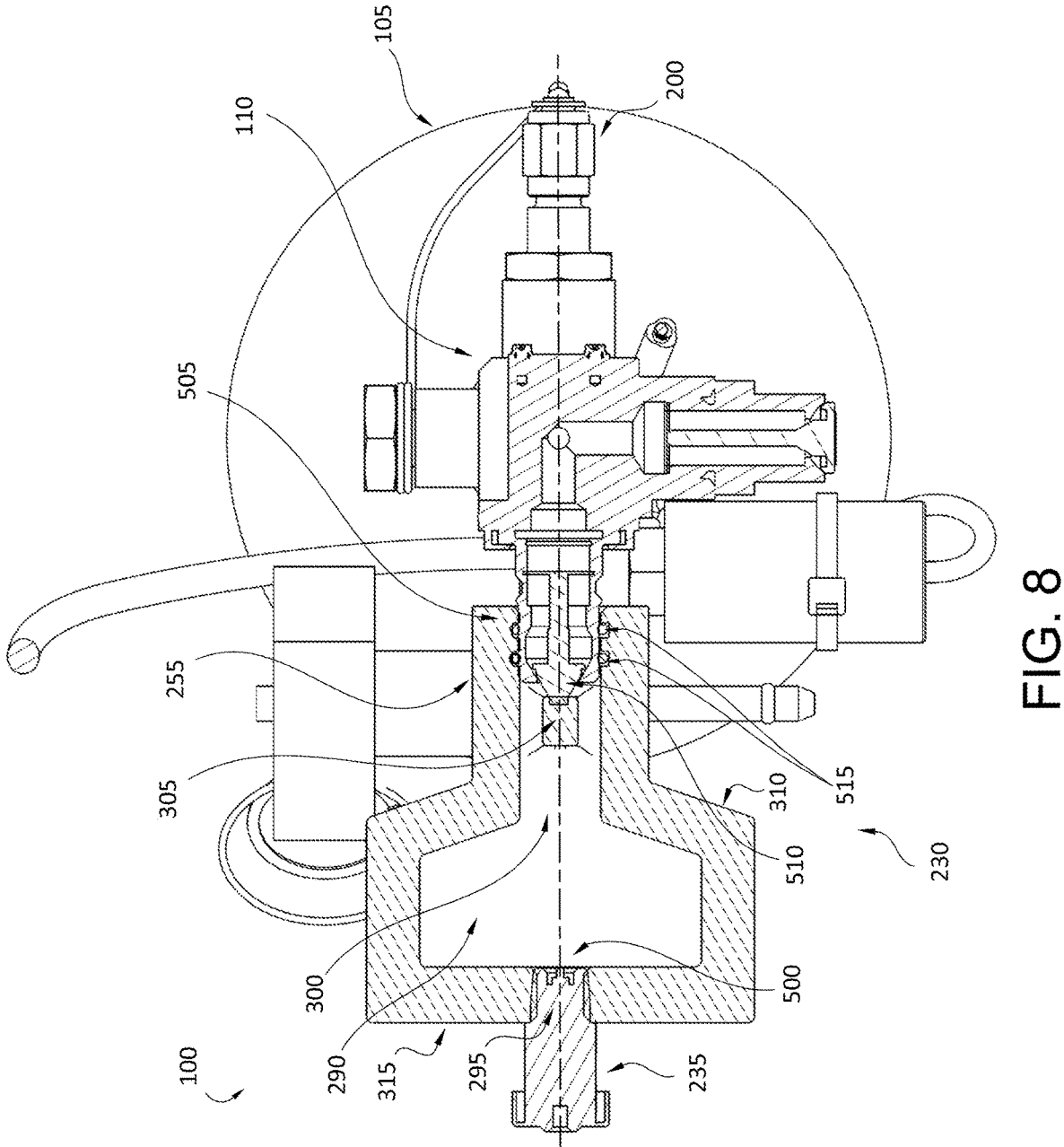
FIG. 8 illustrates an example cross-section view of the pressure relief shipping adapter in FIG. 6 coupled to the example bottle head assembly, according to certain embodiments.

Described herein are various systems, tools, and methods that provide for a structure to reduce the pressure within a pressurized container of oxygen gas prior to shipping and/or transportation. FIGS. 1 and 2 illustrates a perspective view of an exemplary pressure relief shipping adapter 100 and a bottle head assembly 110 coupled to a container 105, according to certain embodiments. FIGS. 6 and 8 illustrates another exemplary pressure relief shipping adapter 100 and a bottle head assembly 110 coupled to a container 105, according to certain embodiments. The pressure relief shipping adapter 100 according to one or more certain embodiments may be configured to reduce the internal pressure of the container 105 to a predetermined value. In one or more embodiments, the container 105 may be a pressure vessel configured to store a gas at a predetermined pressure. Without limitations, the container 105 may contain a volume of oxygen gas. In embodiments, the container 105 may be any suitable size, height, shape, and combinations thereof. Without limitations, the container 105 may generally be a cylindrical tank. The container 105 may comprise any suitable materials configured to withstand a predetermined internal pressure. Without limitations, the suitable materials may be metals, nonmetals, composites, and any combinations thereof.

As illustrated herein, a bottle head assembly 110 may be disposed on top of and coupled to the container 105. In embodiments, there may be an opening through the top of the container 105 to allow for fluid communication between an interior and an exterior of the container 105 of a given gas. As the bottle head assembly 110 is coupled to the top of the container 105, the interior of the container 105 may effectively be sealed. In embodiments, the bottle head assembly 110 may be any suitable size, height, shape, and combinations thereof, and the bottle head assembly 110 may comprise any suitable materials. Without limitations, the suitable materials may be metals, nonmetals, composites, polymers, and any combinations thereof. In one or more embodiments, the pressure relief shipping adapter 100 may be coupled to the container 105 through the bottle head assembly 110.

The bottle head assembly 110 may be configured to seal the container 105, to pressurize the container 105, to depressurize the container 105, and any combinations thereof. In certain embodiments, the bottle head assembly 110 may comprise a servicing port 200 and a mechanical switch 205. The servicing port 200 may be disposed about any suitable location on the bottle head assembly 110. The servicing port 200 may be configured to couple to an external source and allow the flow of a gas (for example, oxygen), into the interior of the container 105. The servicing port 200 may be configured to only allow the flow of the gas one way, such as into the container 105. There may be other suitable components, such as valves, used within the bottle head assembly 110 to preserve the gas within the container 105. As the volume of gas flowing into the container 105 increases, the pressure within the container 105 may increase accordingly.

As illustrated in FIGS. 2 and 6, the mechanical switch 205 may be disposed near a top end 210 of the bottle head assembly 110. As shown, the mechanical switch 205 may be coupled to opposing sides of the bottle head assembly 110 near the top end 210 so as to be at least partially disposed around the bottle head assembly 110. In other embodiments, the mechanical switch 205 may be disposed about any suitable location on the bottle head assembly 110. The mechanical switch 205 may be configured to actuate between a first position and a second position, wherein switching between the first position and the second position may subsequently affect other components of the bottle head assembly 110. In embodiments, the mechanical switch 205 may be any suitable size, height, shape, and combinations thereof. The mechanical switch 205 may comprise any suitable materials such as metals, nonmetals, composites, and any combinations thereof.

In certain embodiments, the mechanical switch 205 may comprise a lateral bar 215, a set of coupling bars 220, and a set of hinges 225. The set of coupling bars 220 may be disposed at opposite sides of the lateral bar 215. In embodiments the set of coupling bars 220 may be perpendicular to the lateral bar 215. Each of the hinges 225 may be disposed at distal ends of each of the coupling bars 220 opposite from where the coupling bars 220 are connected to the lateral bar 215. The set of hinges 225 may couple the distal ends of the set of coupling bars 220 to the top end 210 of the bottle head assembly 110 and may provide a means of rotation for the mechanical switch 205, wherein the mechanical switch 205 may rotate about the set of hinges 225. Without limitations, the mechanical switch 205 may rotate any suitable degree range from the first position to the second position. In embodiments, the mechanical switch 205 may rotate within a degree range from about 0° to about 270°.

Figure 3:
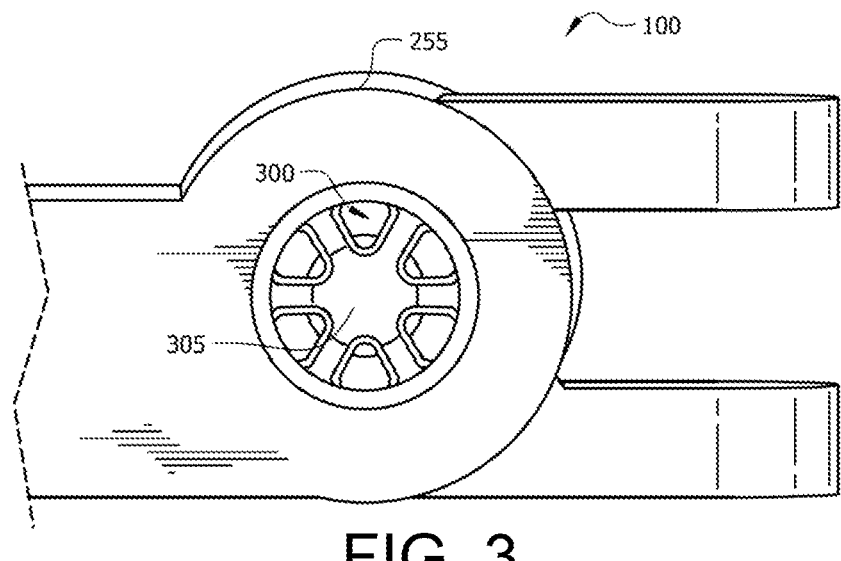
FIG. 3 illustrates an example side view of the pressure relief shipping adapter in FIG. 1, according to certain embodiments.
Figures 7A, 7B:
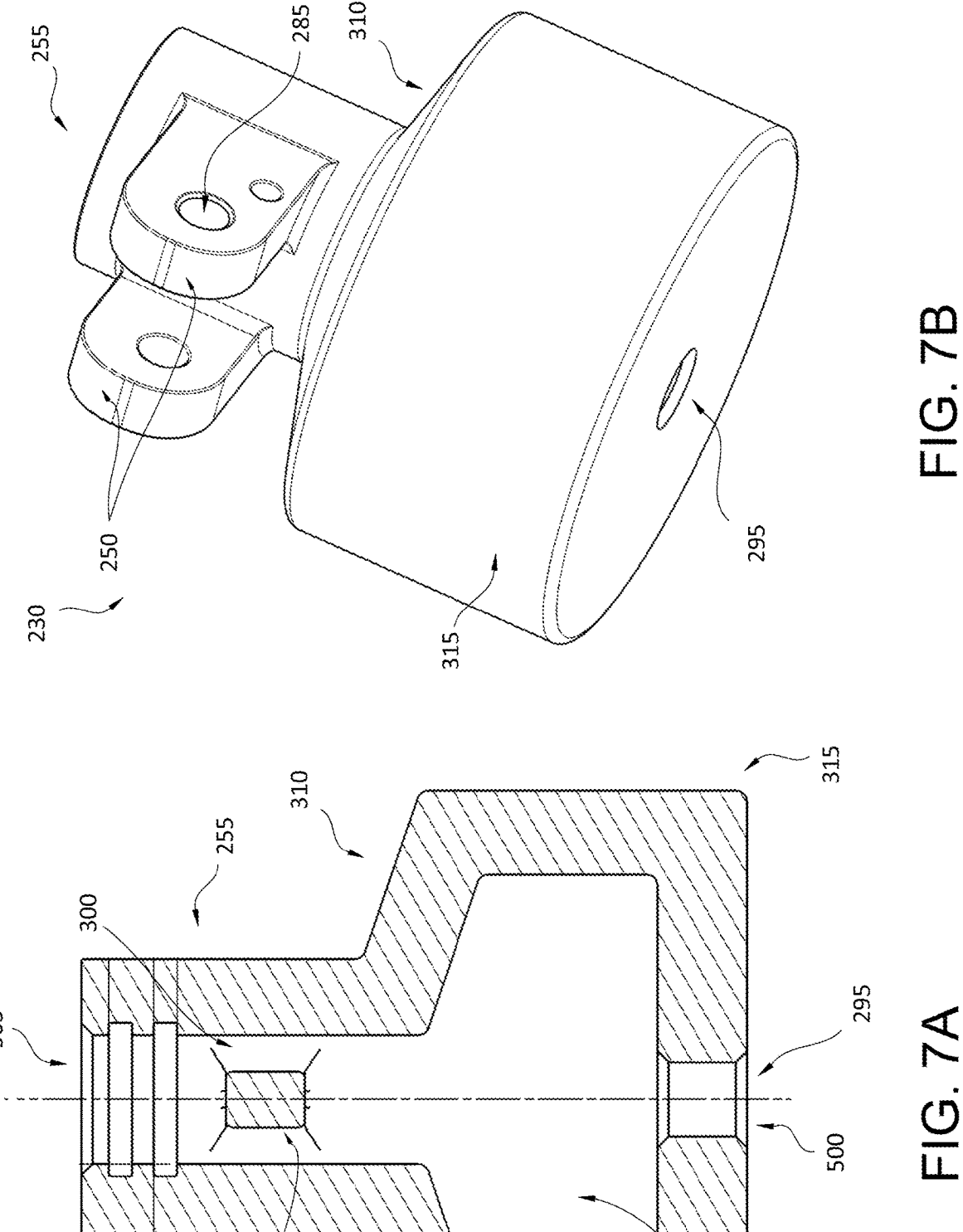
FIG. 7A illustrates an example cross-section view of the pressure relief shipping adapter in FIG. 6, according to certain embodiments.
FIG. 7B illustrates an example perspective view of the pressure relief shipping adapter in FIG. 6, according to certain embodiments.

The pressure relief shipping adapter 100 may be coupled to the bottle head assembly 110 and may interact with components of the bottle head assembly 110. As previously described, the pressure relief shipping adapter 100 may be configured to reduce the internal pressure of the container 105 to a predetermined value. The pressure relief shipping adapter 100 may comprise a body 230, a pressure relief valve 235, and a set of protrusions 250. In embodiments, the body 230 may be any suitable size, height, shape, and combinations thereof. The body 230 may comprise any suitable materials such as metals, nonmetals, composites, and any combinations thereof. The body 230 may be configured to house, contain, accommodate, and any combinations thereof any of the other components of the pressure relief shipping adapter 100 and/or of the bottle head assembly 110. The body 230 may comprise a first portion 255. The first portion 255 of the body 230 may generally be cylindrical in shape and may comprise a through-bore (as schematically illustrated in FIGS. 3, 7B, and 8).

The pressure relief valve 235 may be disposed about the first portion 255 of the body 230. As disclosed, the pressure relief valve 235 may be disposed about one end of the through-bore of the first portion 255, wherein the bottle head assembly 110 may be coupled to the opposing end of the through-bore. Without limitations, any suitable pressure relief valve may be used as the disclosed pressure relief valve 235. In embodiments, the pressure relief valve 235 may be set to a predetermined threshold value. The pressure relief valve 235 may be operable to reduce an internal pressure of the container 105 to the predetermined value of the pressure relief valve 235, based, at least in part, on the operation of the mechanical switch 205.

In certain embodiments, such as illustrated in FIGS. 2-5, the pressure relief shipping adapter 100 may comprise a first bore 240 and an interlocking component 245. In certain embodiments, such as illustrated in FIGS. 2-5, the body 230 may comprise a second portion 260 disposed adjacent to the first portion 255. In embodiments, second portion 260 may generally have a rectangular shape.

In certain embodiments, such as illustrated in FIGS. 2-5, the first bore 240 may be disposed about the second portion 260 of the body 230, wherein the direction of the first bore 240 may be perpendicular to a central axis of the bottle head assembly 110. The first bore 240 may fully extend through the second portion 260. In embodiments, the first bore 240 may not be fully enclosed but may be partially open. As illustrated in FIGS. 4A-4B, there may be a radial gap 265 disposed through a portion of the second portion 260 of the body 230 that exposes the first bore 240 to an external environment. The radial gap 265 may have a uniform arc length along the length of the radial gap 265, wherein the arc length is the distance between two opposing points along a section of a curve (for example, the portion of the second portion 260 designated as the radial gap 265). At each of a first end 270a and a second end 270b (collectively referred to herein as the "ends 270") of the radial gap 265, the arc length may be greater than the arc length along the length of the radial gap 265. For example, the central angle used to calculate the arc length at the ends 270 may be greater than the central angle used to calculate the arc length along the length of the radial gap 265. In embodiments, the arc length at both of the ends 270 may be equivalent. While the arc length at the ends 270 may be greater than that along the length of the radial gap 265, each of the first end 270a and the second end 270b may share a common point used in determining the arc length with the section along the length of the radial gap 265. For example, the arc length along the length of the radial gap 265 may be determined from a first point 275a and a second point 275b of a portion of the circumference of the first portion. The arc length of the first end 270a may be determined, at least in part, on the first point 275a, and the arc length of the second end 270b may be determined, at least in part, on the second point 275b. As such, the arc lengths of the first end 270a and the second end 270b may be disposed in opposing tangential directions from each other.

In certain embodiments, such as illustrated in FIGS. 2-5, and as illustrated in FIG. 2, the first bore 240 may be configured to receive and at least partially contain the interlocking component 245. In embodiments, the interlocking component 245 may be any suitable size, height, shape, and combinations thereof. The interlocking component 245 may generally be in the shape of a rod or an elongated cylinder. The interlocking component 245 may comprise any suitable materials such as metals, nonmetals, composites, and any combinations thereof. The interlocking component 245 may be configured to interact with the mechanical switch 205 of the bottle head assembly 110. The interlocking component 245 may comprise a first tab 280a and a second tab 280b (collectively referred to herein as the "tabs 280"). Both the first tab 280a and the second tab 280b may be structures disposed along the length of the interlocking component 245 and extend outwards from the interlocking component 245. In embodiments, both tabs 280 may comprise the same size, height, shape, and combinations thereof. Both tabs 280 further may be disposed in the same direction parallel to each other. During operations, the interlocking component 245 may be configured to translate at least partially along the first bore 240, wherein the first tab 280a may be confined by the radial gap 265.

To couple the pressure relief shipping adapter 100 to the bottle head assembly 110, the set of protrusions 250 may be utilized. In embodiments, as illustrated in FIGS. 2, 3, 6, and 7B, the set of protrusions 250 may be disposed about the first portion 255 of the body 230. The set of protrusions 250 may comprise a hole 285 configured to receive a pin 288 to fix the pressure relief shipping adapter 100 to the bottle head assembly 110. The hole 285 may be located at the same position on each of the protrusions 250 to where there is a single, concentric hole as hole 285. In embodiments, a portion of the bottle head assembly 110 may be disposed between the set of protrusions 250, wherein that portion may also have a hole. The hole of the portion of the bottle head assembly 110 may be aligned with the hole 285, wherein the pin 288 may be disposed through the hole 285 and the hole in the portion of the bottle head assembly 110. In one or more embodiments, any suitable fasteners may be used with or in replacement of the pin 288 to secure the set of protrusions 250 to the portion of the bottle head assembly 110, thereby coupling the pressure relief shipping adapter 100 to the bottle head assembly 110.

FIG. 3 illustrates a side view of the pressure relief shipping adapter 100, according to certain embodiments. As illustrated, a bore 300 may be defined as the through-channel of the first portion 255 of the body 230 along a corresponding longitudinal axis of body 230. As previously disclosed, in certain embodiments, such as illustrated in FIGS. 2 and 8, the pressure relief valve 235 may be disposed at one end of the bore 300 and the bottle head assembly 110 may be coupled to the opposite end of the bore 300. In certain embodiments, such as illustrated in FIG. 2 without limitations, the through-channel defining the bore 300 may comprise a through-bore having a uniform cross-sectional shape and area taken along the full length of the corresponding longitudinal axis. In certain embodiments, such as illustrated in FIGS. 7A and 8 without limitations, the through-channel defining the bore 300 may not have a uniform cross-sectional shape or uniform cross-sectional area taken along the full length of the corresponding longitudinal axis.

There may be a valve depressor 305 disposed within the bore 300 configured to actuate a valve (shown on FIGS. 5, 7A, and 8) on the bottle head assembly 110. In embodiments, the valve depressor 305 may be disposed at any suitable position along the length of the bore 300. The valve depressor 305 may be disposed about the middle of the bore 300, near one end of the bore 300, or near the opposing end of the bore 300. In embodiments, the valve depressor 305 may be any suitable size, height, shape, and combinations thereof. The valve depressor 305 may generally comprise a circular shape with one or more extensions extending outwards towards a wall defining the bore 300. The valve depressor 305 may further comprise any suitable materials such as metals, nonmetals, composites, and any combinations thereof. During operations, a force may be applied to push the valve of the bottle head assembly 110 into the valve depressor 305 to open a channel providing communication from within the container 105 (referring to FIGS. 1, 5, and 8) to outside the container 105, wherein this communication may provide gas to flow out of the container 105.

Figure 4A:
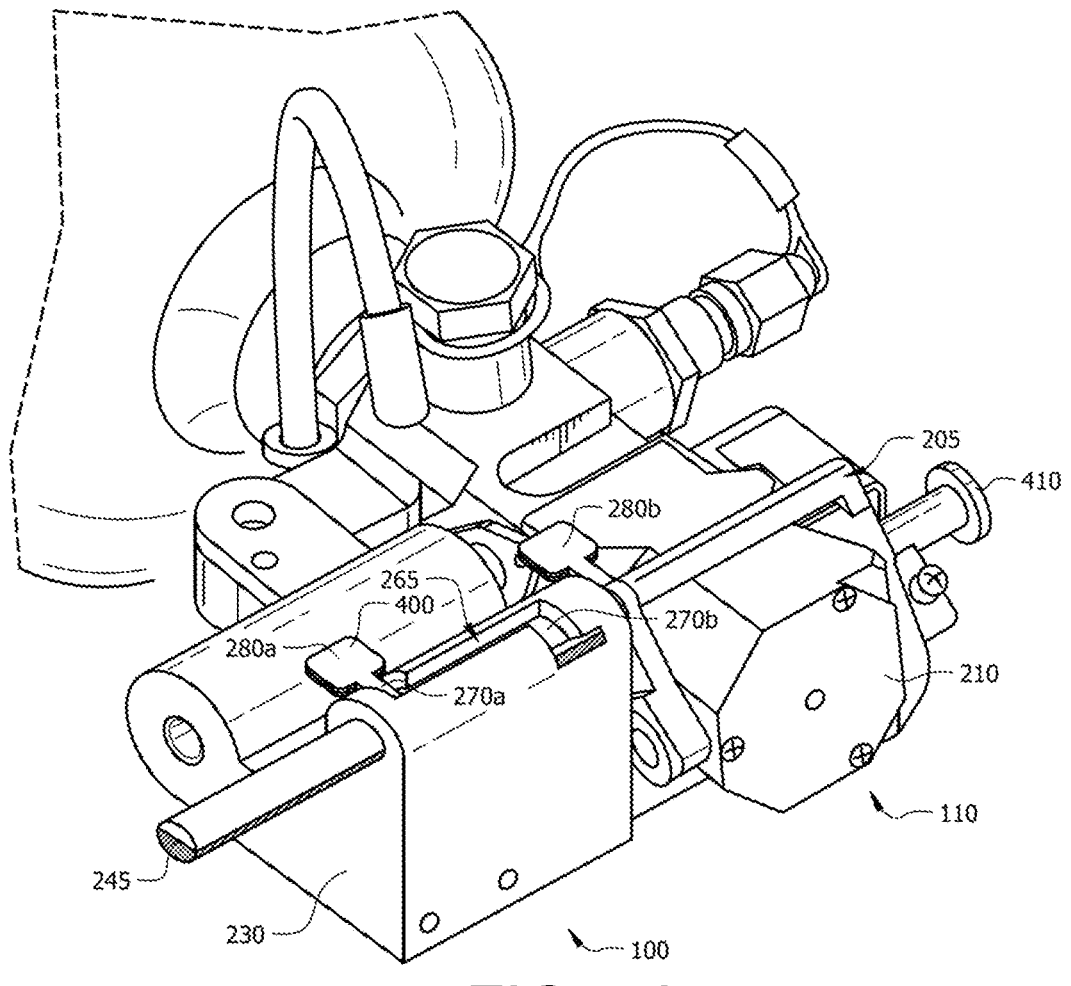
FIG. 4A illustrates an example perspective view of the pressure relief shipping adapter in FIG. 1 in a first position, according to certain embodiments.
Figure 4B:
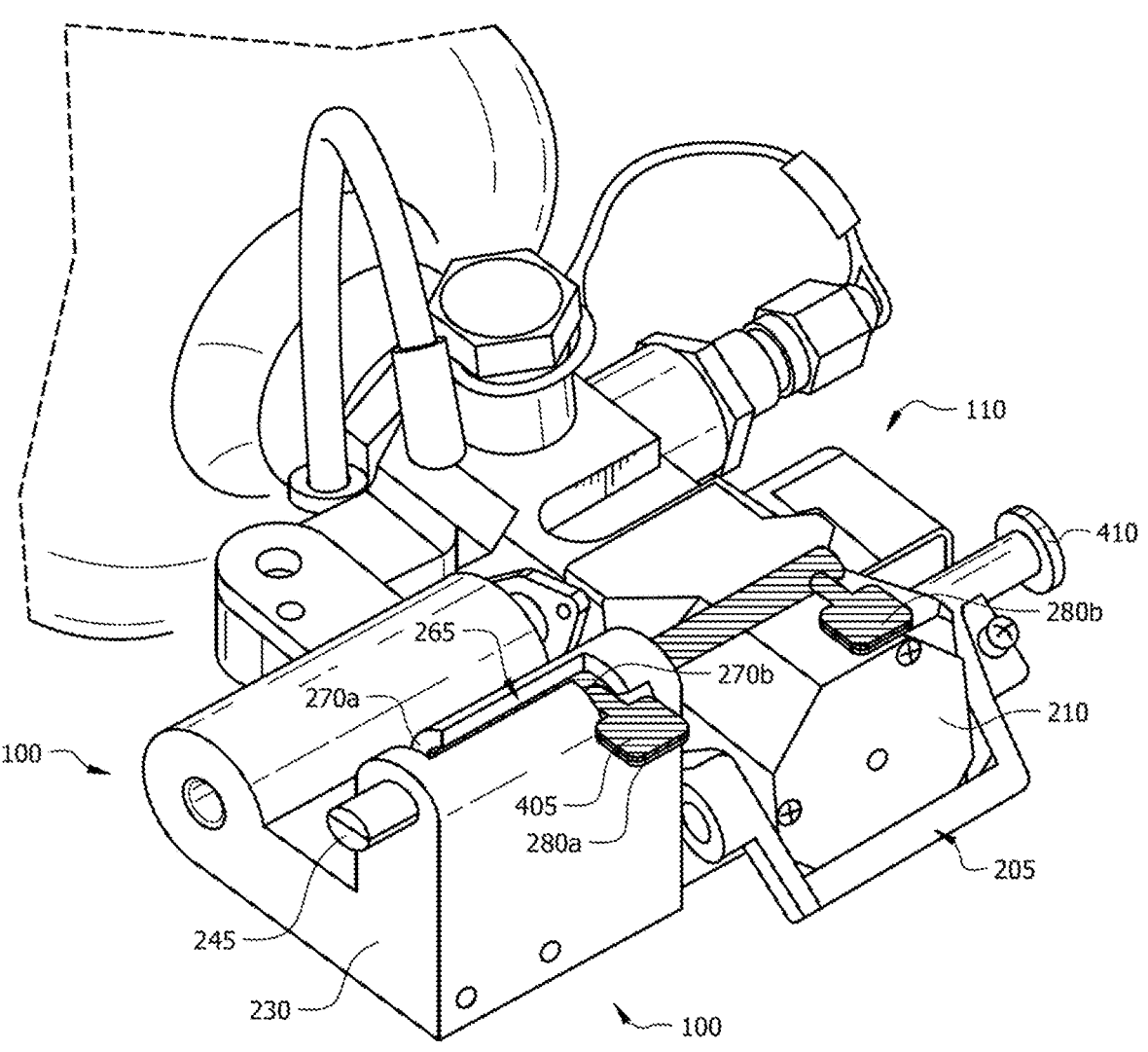
FIG. 4B illustrates an example perspective view of the pressure relief shipping adapter in FIG. 1 in a second position, according to certain embodiments.

In certain embodiments, one or more interlocking systems may be provided to prevent inadvertent actuation of gas flow. FIGS. 4A-4B illustrate perspective views of the pressure relief shipping adapter 100 coupled to the bottle head assembly 110 in different positions, according to certain embodiments. FIG. 4A illustrates the exemplary pressure relief shipping adapter 100 in a first position, and FIG. 4B illustrates the exemplary pressure relief shipping adapter 100 in a second position, according to certain embodiments provided with an interlocking arrangement illustrated in FIGS. 4A and 4B. As illustrated, the pressure relief shipping adapter 100 may be coupled to the bottle head assembly 110 while in the first position, wherein the first tab 280a of the interlocking component 245 may be disposed in the first end 270a of the radial gap 265. The second tab 280b may be disposed adjacent to the body 230 between the pressure relief shipping adapter 100 and the bottle head assembly 110. At this stage, the pressure relief shipping adapter 100 may be at the first position, and the mechanical switch 205 may be at the first position. The first position of the mechanical switch 205 may be where the mechanical switch 205 is disposed against a surface of the bottle head assembly 110 perpendicular to the top end 210. During operations, the mechanical switch 205 may be actuated to rotate about the set of hinges 225 (referring to FIG. 2) to a second position, wherein as the mechanical switch 205 rotates, there is no physical interference from the interlocking component 245.

In certain embodiments, such as illustrated in FIGS. 4A, 4B, and 6, before the mechanical switch 205 is rotated, a pin 410 may be actuated (for example, pushed or pulled) in order to remove any inhibiting structure of the mechanical switch 205. In embodiments, rotating the mechanical switch 205 from the first position to the second position may actuate the valve 510 (as illustrated in FIGS. 5 and 8) of the bottle head assembly 110 to vent any contents held within the container 105 (referring to FIGS. 1 and 8).

Returning to the exemplary embodiments of FIGS. 4A-4B provided with a specific interlocking arrangement, without limitations, once the mechanical switch 205 is in the second position, the pressure relief shipping adapter 100 may be operable to change to the second position, as illustrated in FIG. 4B. The first tab 280a may rotate about a central axis of the interlocking component 245 to align with the length of the radial gap 265. Once aligned, the first tab 280a may translate along the length of the radial gap 265. After translating along the length of the radial gap 265, the first tab 280a may be rotated along the arc length of the second end 270b of the radial gap 265. As the first tab 280a rotates and translates, the second tab 280b rotates and translates accordingly as they are connected through the interlocking component 245. This may be designated as the second position of the exemplary pressure shipping adapter 100 featuring an interlocking arrangement illustrated in FIGS. 4A-4B. Prior to rotation, a front surface 400 of both the tabs 280 may convey information to an operator. For example, the front surface 400 may indicate to the operator that the container 105 associated with the pressure relief shipping adapter 100 is not ready for transportation or shipment between locations. The container 105 may not be ready when the internal pressure of the container 105 has not been vented or reduced to a predetermined value. Without limitations, the front surface 400 may comprise any suitable data, such as numbers and/or letters, a specific color, or combinations thereof. After rotation, a back surface 405 of both the tabs 280 may indicate to the operator that the container 105 associated with the pressure relief shipping adapter 100 is ready for transportation or shipment between locations. Similar to the front surface 400, the back surface 405 may comprise any suitable data, such as numbers and/or letters, a specific color, or combinations thereof.

Figure 5:
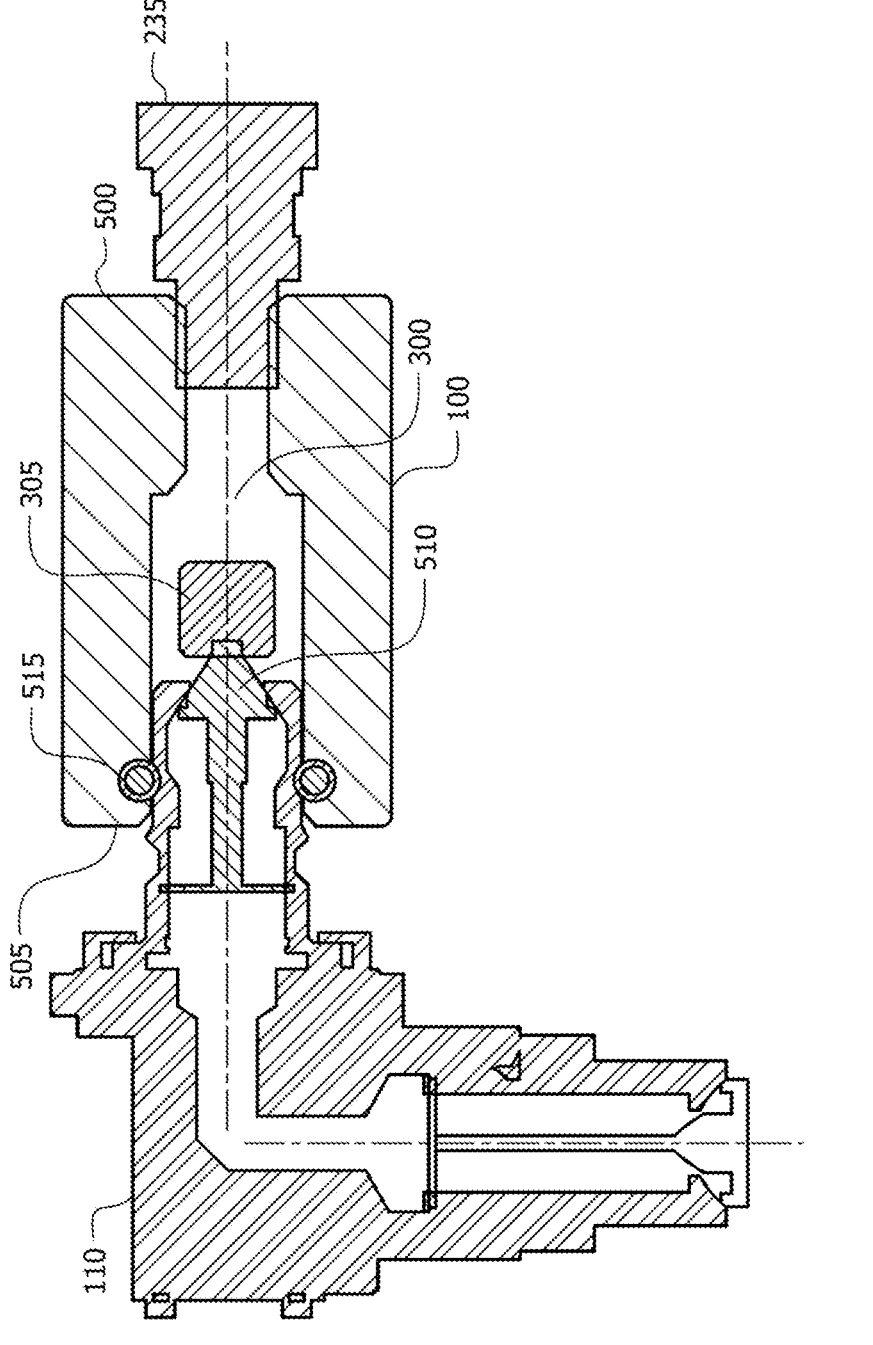
FIG. 5 illustrates an example cross-section view of the pressure relief shipping adapter in FIG. 1 coupled to the example bottle head assembly in FIG. 2, according to certain embodiments.

FIGS. 5 and 8 illustrate a cross-sectional views of the pressure relief shipping adapter 100 coupled to the bottle head assembly 110. As illustrated, the pressure relief valve 235 may be disposed at a first end 500 of the bore 300 and the bottle head assembly 110 may be coupled to a second end 505 of the bore 300 opposite from the first end 500. A valve 510 of the bottle head assembly 110 may be at least partially inserted into the second bore 300. The valve 510 may be operable to vent and/or relieve the contents of the container 105 as the bottle head assembly 110 is placed in fluid communication with the interior of the container 105. In embodiments, the valve 510 may be actuated when depressed by an external structure. As the valve 510 is inserted into the second bore 300, the valve 510 may be actuated by the valve depressor 305. In other embodiments, the valve 510 may be disposed adjacent to and abut the valve depressor 305, when inserted into the second bore 300, and there may be actuation through the mechanical switch 205 (such as illustrated in FIGS. 2 and 6). As illustrated, there may be one or more seals 515 disposed in the bore 300 configured to seal the valve 510 or the bottle head assembly 110 against the pressure relief shipping adapter 100. By way of example and not limitation, FIG. 5 illustrates a single seal 515. By way of example and not limitation, FIG. 8 illustrates a multiple seals 515. In certain embodiments, each of the seals 515 may be provided with one or more grooves to receive the corresponding seal. The seals 515 may prevent any gas released by the valve 510 from escaping through the coupling of the bottle head assembly 110 to the pressure relief shipping adapter 100. In embodiments, at least a portion of the released gas from the valve 510 into the bore 30 may be expelled from the pressure relief shipping adapter 100 through the pressure relief valve 235, wherein the pressure relief valve 235 may provide communication to an external environment until the predetermined threshold value of the pressure relief valve 235 is met.

In certain embodiments and under particular conditions, pressure relief valve 235 may experience fluctuating conditions of rapid and/or repeated opening and closing. By way of example and not limitation, valve fluctuation or instability can generate undesirable heat, increase mechanical and component stresses, and/or decrease operating lifespans. In certain embodiments, an increased volume of bore 300 can mitigate or prevent valve instability and/or oscillation, such as by providing a damping volume for an intermediate gas volume in the pressure relief shipping adapter 100. FIGS. 6-8 illustrate certain embodiments of pressure relief shipping adapter 100 provided with an internal chamber 290 to provide such an increased volume of bore 300.

By way of example and not limitation, internal chamber 290 may comprise a first section corresponding to first portion 255 of body 230, which may be provided with an initial cross-sectional shape and/or area of bore 300. By way of example and not limitation, internal chamber 290 may comprise a second section corresponding to a transitional portion 310, which may be provided to increase an initial cross-sectional area of bore 300 at first portion 255 to a larger cross-sectional area of internal chamber 290 at a third section 315. By way of example and not limitation, internal chamber 290 may comprise a third section 315 comprising a larger internal cross-sectional area and/or internal volume than provided at first portion 255 or transitional portion 310. In certain embodiments, the third section may comprise an outlet 295. Pressure relief valve 235 may be coupled to outlet 295.

In certain embodiments, first portion 255 may comprise a cylindrical volume, transitional portion 310 may comprise a truncated cone volume, and/or third section 315 may comprise a cylindrical volume. In certain embodiments, third section 315 may comprise a larger internal and/or external volume than first portion 255 or transitional portion 310.

The present disclosure may provide numerous advantages, such as the various technical advantages that have been described with respective to various embodiments and examples disclosed herein. Other technical advantages will be readily apparent to one skilled in the art from the following figures, descriptions, and claims. Moreover, while specific advantages have been enumerated in this disclosure, various embodiments may include all, some, or none of the enumerated advantages.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A pressure relief shipping adapter, comprising:
a body comprising a first portion, a transitional portion, and a second portion, wherein the transitional portion is disposed between the first portion and the second portion, wherein:
the first portion comprises:
a set of protrusions and a hole disposed through the set of protrusions; and
an inlet disposed at a first end of the body; and
the second portion comprises an outlet disposed at a second end of the body, wherein the outlet is concentric with the inlet;
an internal chamber within the body comprising a first section, a second section, and a third section, wherein:
the first section is disposed within the first portion of the body;
the second section is disposed within the transitional portion of the body; and
the third section is disposed within the second portion of the body and comprises a larger volume than the first section operable to provide a damping volume for an intermediate gas volume in the pressure relief shipping adapter; and
a pressure relief valve disposed at the second end of the body and coupled to the outlet, wherein the outlet defines a passage having a volume smaller than a volume of the first section.

2. The pressure relief shipping adapter of claim 1, further comprising a valve depressor disposed within the internal chamber.

3. The pressure relief shipping adapter of claim 1, further comprising a first seal and a second seal disposed within the internal chamber proximate to the inlet.

4. The pressure relief shipping adapter of claim 3, further comprising a first groove configured to receive the first seal and a second groove configured to receive the second seal.

5. The pressure relief shipping adapter of claim 1, wherein the second portion comprises a larger diameter than the first portion.

6. The pressure relief shipping adapter of claim 1, wherein the first section comprises a cylindrical volume, wherein the second section comprises a truncated cone volume, and wherein the third section comprises a cylindrical volume.

7. A method of using a pressure relief shipping adapter, comprising:

coupling the pressure relief shipping adapter to a bottle head assembly, wherein the bottle head assembly is coupled to a container containing a pressurized gas;

reducing an internal pressure of the container by displacing a valve of the bottle head assembly into a valve depressor, the valve depressor disposed within an internal chamber defined by a body of the pressure relief shipping adapter, wherein a third section of the body comprises a larger volume than a first section of the body operable to provide a damping volume for an intermediate gas volume in the pressure relief shipping adapter; and discharging the pressurized gas from the container, through the body of the pressure relief shipping adapter, and out an outlet of the body, wherein the outlet defines a passage having a volume smaller than a volume of the first section.

8. The method of claim 7, wherein coupling the pressure relief shipping adapter to the bottle head assembly comprises inserting a pin through a hole in a set of protrusions of the pressure relief shipping adapter.

9. The method of claim 8, further comprising aligning a hole of a portion of the bottle head assembly disposed between the set of protrusions with the hole of the set of protrusions to be concentric.

10. The method of claim 7, wherein the valve of the bottle head assembly is sealed within the internal chamber of the pressure relief shipping adapter.

11. The method of claim 7, wherein a pressure relief valve is disposed at an end of the body of the pressure relief shipping adapter, wherein the internal pressure of the container is reduced by venting the pressurized gas through the pressure relief valve.

12. A container pressure system, comprising:

a bottle head assembly coupled to a container, wherein the container comprises a pressurized gas and the bottle head assembly comprises a valve; and a pressure relief shipping adapter coupled to the bottle head assembly, the pressure relief shipping adapter comprising:

a body comprising a first portion, a transitional portion, and a second portion, wherein the transitional portion is disposed between the first portion and the second portion, wherein:

the first portion comprises:

a set of protrusions and a hole disposed through the set of protrusions; and an inlet disposed at a first end of the body; and the second portion comprises an outlet disposed at a second end of the body, wherein the outlet is concentric with the inlet;

an internal chamber within the body comprising a first section, a second section, and a third section, wherein:

the first section is disposed within the first portion of the body;

the second section is disposed within the transitional portion of the body; and the third section is disposed within the second portion of the body and comprises a larger volume than the first section operable to provide a damping volume for an intermediate gas volume in the pressure relief shipping adapter; and a pressure relief valve disposed at the second end of the body and coupled to the outlet, wherein the outlet defines a passage having a volume smaller than a volume of the first section.

13. The container pressure system of claim 12, wherein the first section comprises a cylindrical volume, wherein the second section comprises a truncated cone volume, and wherein the third section comprises a cylindrical volume.

14. The container pressure system of claim 12, wherein the pressure relief shipping adapter further comprises a valve depressor disposed within the internal chamber, and wherein the valve of the bottle head assembly is inserted into the first end of the body via the inlet.

15. The container pressure system of claim 12, wherein the pressure relief shipping adapter further comprises a first seal and a second seal disposed within the internal chamber proximate to the inlet.

16. The container pressure system of claim 15, wherein the pressure relief shipping adapter further comprises a first groove configured to receive the first seal and a second groove configured to receive the second seal.

17. The container pressure system of claim 12, wherein the second portion comprises a larger diameter than the first portion.

18. The container pressure system of claim 12, wherein a hole of a portion of the bottle head assembly disposed between the set of protrusions is aligned with the hole of the set of protrusions to be concentric and to receive a pin.

* * * * *